June 24, 1930.　　P. PASCHEN ET AL　　1,765,611

ELECTRICAL METER

Filed July 30, 1928

INVENTORS.
Paul Paschen
and Georg Reime.
BY
ATTORNEY

Patented June 24, 1930

1,765,611

UNITED STATES PATENT OFFICE

PAUL PASCHEN AND GEORG REIME, OF NUREMBERG, GERMANY, ASSIGNORS TO WESTINGHOUSE ELECTRIC AND MANUFACTURING COMPANY, A CORPORATION OF PENNSYLVANIA

ELECTRICAL METER

Application filed July 30, 1928, Serial No. 296,137, and in Germany August 11, 1927.

Our invention relates to electrical meters and particularly to maximum-demand meters having means associated therewith for rendering the indicators active only at peak loads.

Our invention has for an object to provide a metering arrangement whereby an indication of the demand of energy being consumed by a customer at times of peak load may be obtained.

In accordance with our invention, a maximum-demand meter is mounted in the consumer's plant to be active only in times of peak load. The device is operated, preferably, by a frequency relay that is actuated from the central station by means of control currents.

The frequency relay controls a bridging switch that normally short-circuits the heating element of the maximum-demand device but is operable to remove the short-circuit during the time of peak load to permit operation of the meter.

The bridging switch, comprising a movable contact that coacts with a contact for switching-in and a contact for short circuiting the heating element, is so constructed that the movable contact engages only one or the other of the contacts in its extreme positions and connects the two contacts with each other in its intermediate position, in order to avoid sparking during the changeover operation.

Our invention may be more readily understood if the accompanying drawings are referred to in connection with the following description.

Figure 1:
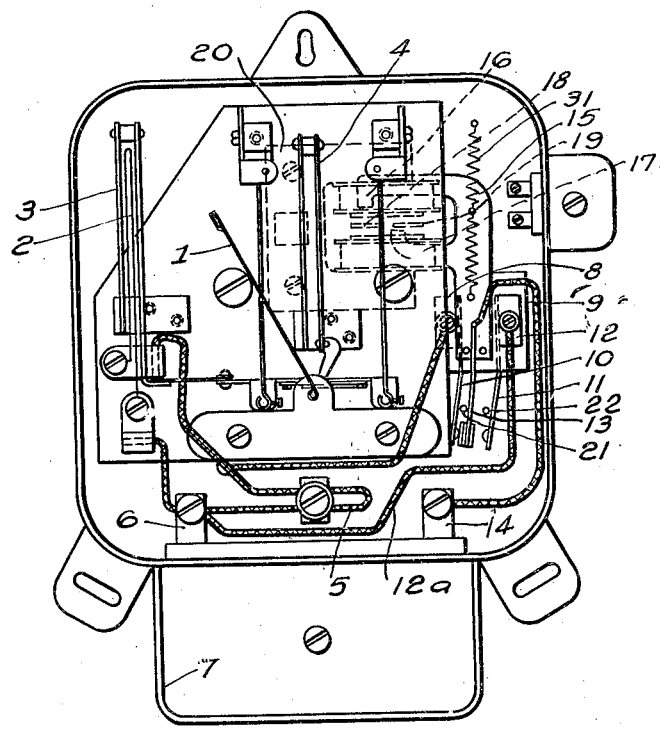
Fig. 1 is a view, in front elevation, of a maximum-demand meter, without its cover.

Referring to Fig. 1, a maximum-demand meter without its cover, comprises a pointer 1 that is actuated by a thermostat 3 which is heated by a resistor 2. Another thermostat 4 is provided to compensate the instrument for errors incident to temperature changes of the surrounding medium. The pointer 1 actuates a slide indicator (not illustrated) that remains in the position of greatest deflection of the pointer.

The heating resistor 2 is in parallel-circuit relation to an adjustable resistor 5, and is electrically connected between a terminal 6 of a terminal board 7 and a terminal 8 of a bridging switch 9. A contact spring 10 is mounted on the terminal 8 of the bridging switch 9. A second contact spring 11 is attached to a terminal 12 that is electrically connected to the terminal 6 by a conductor 12ª.

A movable contact 13 is electrically connected to a terminal 14 of the board 7, and is mounted for movement between the contact springs 10 and 11. The movable contact 13 is controlled by an actuating lever 15 as hereinafter described.

Figure 2:
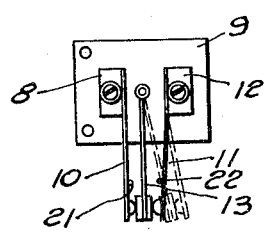
Fig. 2 is a view, in front elevation, of the bridging switch shown in Fig. 1.

The contact springs 10 and 11 are, respectively, biased inwardly against stops 21 and 22 that are so arranged that, when the movable contact 13 is in its intermediate position, shown in Fig. 2, it is in engagement with the two contacts 10 and 11 but, when in an extreme position, it engages only one of the contacts 10 and 11.

In the position of the switch 9 shown in Fig. 1, the heating resistor 2 of the thermostat 3 is energized, and the maximum-demand meter is active. The switch is moved to such position at the time of peak loads.

When a period of peak load is ended, a reed 18 of a frequency relay 20 is vibrated by means of a control current, of a predetermined frequency, and moves the member 13 into the position shown in dotted lines in Fig. 2. In such position, the heating resistor 2 is short circuited, which renders the maximum-demand device inactive. The member 13 is restored to an initial position (Fig. 1) by introducing a control current of another frequency to vibrate a reed 19.

Actuation of the movable contact 13 is effected by means of a frequency-responsive relay mounted in the meter casing adjacent to switch 9. The relay comprises a pair of spaced longitudinally aligned electromagnets and vibratory reeds 18 and 19 disposed therebetween.

The actuating lever 15 is pivoted, as by a pin 30, to the frame of the meter and is biased toward either of its extreme positions by a spring 31. The lever is provided with a pair of arms 16 and 17 which are so disposed that, in one extreme position of the lever 15, the arm 16 engages, or is adjacent to, the reed 18, and, in the other position of the lever 15, the arm 17 engages, or is adjacent to, the reed 19.

The vibratory reeds have, respectively, a definite period of vibration, and may be vibrated, selectively, by impressing upon the circuit of the electromagnets currents of a frequency corresponding to the periodicity of the reeds.

The lever 15 is provided, further, at one end thereof, with a pair of projections (Fig. 1) adapted to receive therebetween the movable contact arm 13.

From the above described construction, it is apparent that, with the elements in the position shown in Fig. 1, upon the vibration of the reed 19 the reed will strike the arm 17 and cause the movement of the lever arm 15 to its other extreme position.

Incident to the movement of the lever arm 15, the contact arm 13 is moved from the position shown against the stop 21 to its opposite position against the stop 22. The lever 15, and contact 13, may be returned to the original position, when desired, by energizing the electromagnets by a current having a frequency corresponding to the periodicity of the reed 18. In this operation, the vibration of the reed 18 causes it to engage the arm 16 and effects movement of the lever arm 15, and, consequently, the contact arm 13, to its other extreme position.

While we have shown and described a frequency-responsive relay, of a particular type, relays of other types may be employed.

Figure 3:
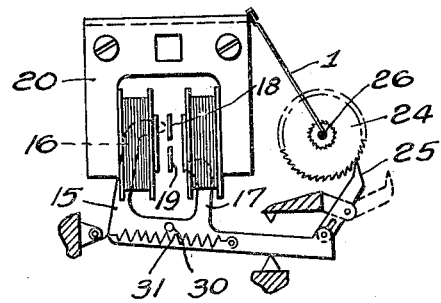
Fig. 3 is a view, in elevation, of a modification of a device for making the indicator active or inactive by means of a frequency relay.

Another modification of our invention is shown in Fig. 3. Here, the frequency relay 20 controls a ratchet device comprising a ratchet wheel 24 and a pawl 25. The wheel 24 is mounted on a spindle 26 of the pointer 1. The pawl 25 normally engages the teeth of the ratchet wheel and is disengaged therefrom by the frequency relay 15 only during the period of peak load.

It will be apparent that, instead of causing the ratchet mechanism to coact with the pointer 1, it may be designed to coact directly with the thermostat 3.

The pointer 1 may also be made inactive during predetermined periods by providing a disengageable coupling between the thermostat 3 and the pointer 1 to be controlled by the frequency relay 20.

In accordance with the provisions of the patent statutes, we have described the principle of operation of our invention, together with the apparatus that we now consider to represent the best embodiment thereof; but we desire to have it understood that the apparatus shown and described is only illustrative and that the invention may be carried out and applied to other modifications.

We claim as our invention:

1. In combination, a maximum demand meter and means, including a frequency-responsive relay, having a switch that normally short circuits the meter to render the meter active only during peak-load periods.

2. In combination, a thermal maximum-demand meter and means, including a frequency-responsive relay, for rendering the meter active only during peak-load periods.

3. A demand meter comprising thermostat actuating means and a heating element therefor, of a frequency-responsive relay associated with said meter, and means controlled by said relay for controlling the energization of said heating element to render the meter active only during peak-load periods.

4. A demand meter comprising a thermostat and a heating element therefor, a frequency relay for controlling the operation of said meter, and a bridging switch controlled by said relay, said bridging switch comprising a movable contact, a contact for connecting said heating element in circuit relation, and a contact for short circuiting said heating element, said contacts being so disposed that, in each extreme position, the movable contact engages only one of the other contacts and, in an intermediate position, engages both of the other contacts.

5. In a maximum-demand meter having an indicating member, means for rendering said member active or inactive comprising a ratchet wheel coacting with said member, a pawl for engaging said wheel and a frequency-responsive relay for controlling said pawl.

6. A remotely controlled unitary encased maximum demand meter comprising means for indicating the demand of a quantity, and means mounted within the casing of said meter responsive to the frequency of currents impressed upon said system for controlling said indicating means to operate only during peak-load periods.

7. In combination, a maximum demand meter and means associated therewith for making said meter active only during peak-load demand periods, said means being controlled from a point remote from said meter.

In testimony whereof, we have hereunto subscribed our names this 19th day of June, 1928.

PAUL PASCHEN.
GEORG REIME.